United States Patent [19]

Lech, Jr. et al.

[11] 4,377,225
[45] Mar. 22, 1983

[54] CLUTCH DRIVEN PLATE ASSEMBLY WITH VARIABLE FRICTION AREA

[75] Inventors: Thaddeus Lech, Jr., Sterling Heights; Richard T. Popchock, Lake Orion, both of Mich.

[73] Assignee: Borg-Warner Corporation, Chicago, Ill.

[21] Appl. No.: 207,827

[22] Filed: Nov. 17, 1980

[51] Int. Cl.³ .............................................. F16D 13/69
[52] U.S. Cl. ............................................... 192/107 C
[58] Field of Search .......................... 192/107 C, 107 R

[56] References Cited

U.S. PATENT DOCUMENTS

| Re. 20,989 | 1/1939 | Wemp | 192/107 C |
|---|---|---|---|
| 2,103,433 | 12/1937 | Newton | 192/107 C |
| 2,207,961 | 7/1940 | Wellman | 192/107 |
| 2,249,281 | 7/1941 | Wellman | 192/107 C |
| 2,794,526 | 6/1957 | Canfield | 192/69 |
| 2,876,879 | 3/1959 | Maurice et al. | 192/84 |
| 2,985,273 | 5/1961 | Binder | 192/68 |
| 3,261,439 | 7/1966 | Binder | 192/107 |
| 3,280,949 | 10/1966 | Ross | 192/107 |
| 3,520,389 | 7/1970 | Smales | 192/107 |
| 3,526,307 | 9/1970 | Falzone | 192/107 |
| 3,696,902 | 10/1972 | Dantele | 192/107 |
| 3,897,859 | 8/1975 | Norcia | 192/107 |

FOREIGN PATENT DOCUMENTS 2424446  4/1978  France .

*Primary Examiner*—Rodney H. Bonck
*Attorney, Agent, or Firm*—James A. Geppert

[57] ABSTRACT

A clutch driven plate assembly for an automotive vehicle wherein the clutch plate has radially extending lobes carrying friction pads of a suitable material, with the pad being mounted on cushioning means so as to present a variable surface contact area to the engaging surfaces of the clutch assembly to decrease the clutching capacity at initial engagement to reduce chatter. As torque demand increases and clutch engagement continues, the clutch capacity is increased by the deforming of the cushioning means to allow the friction pads to flatten against the engaging surfaces and provide a larger contact area.

14 Claims, 15 Drawing Figures

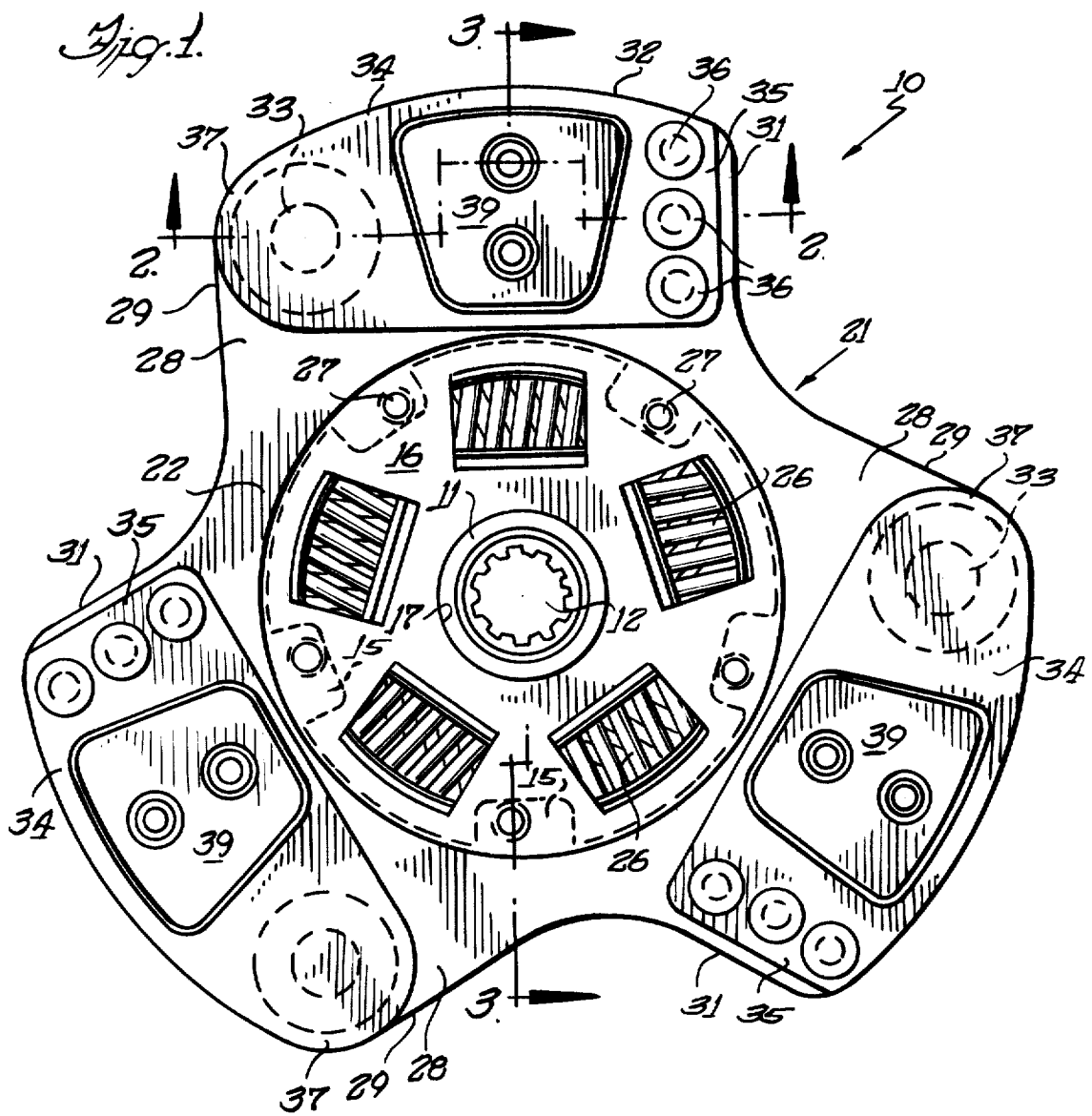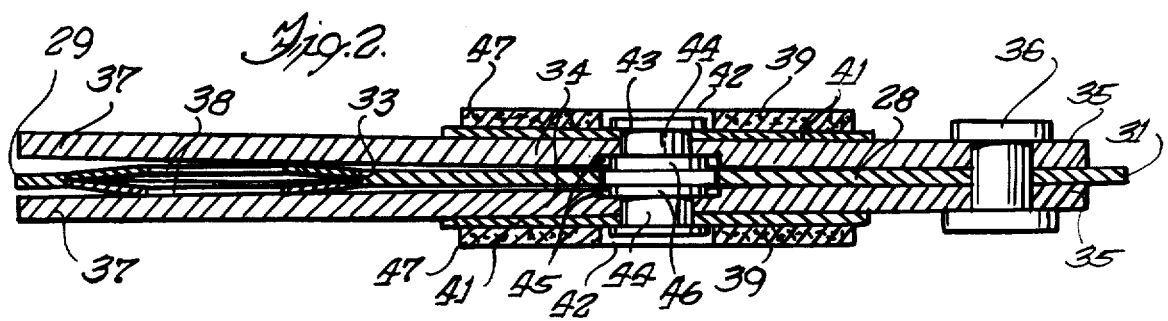

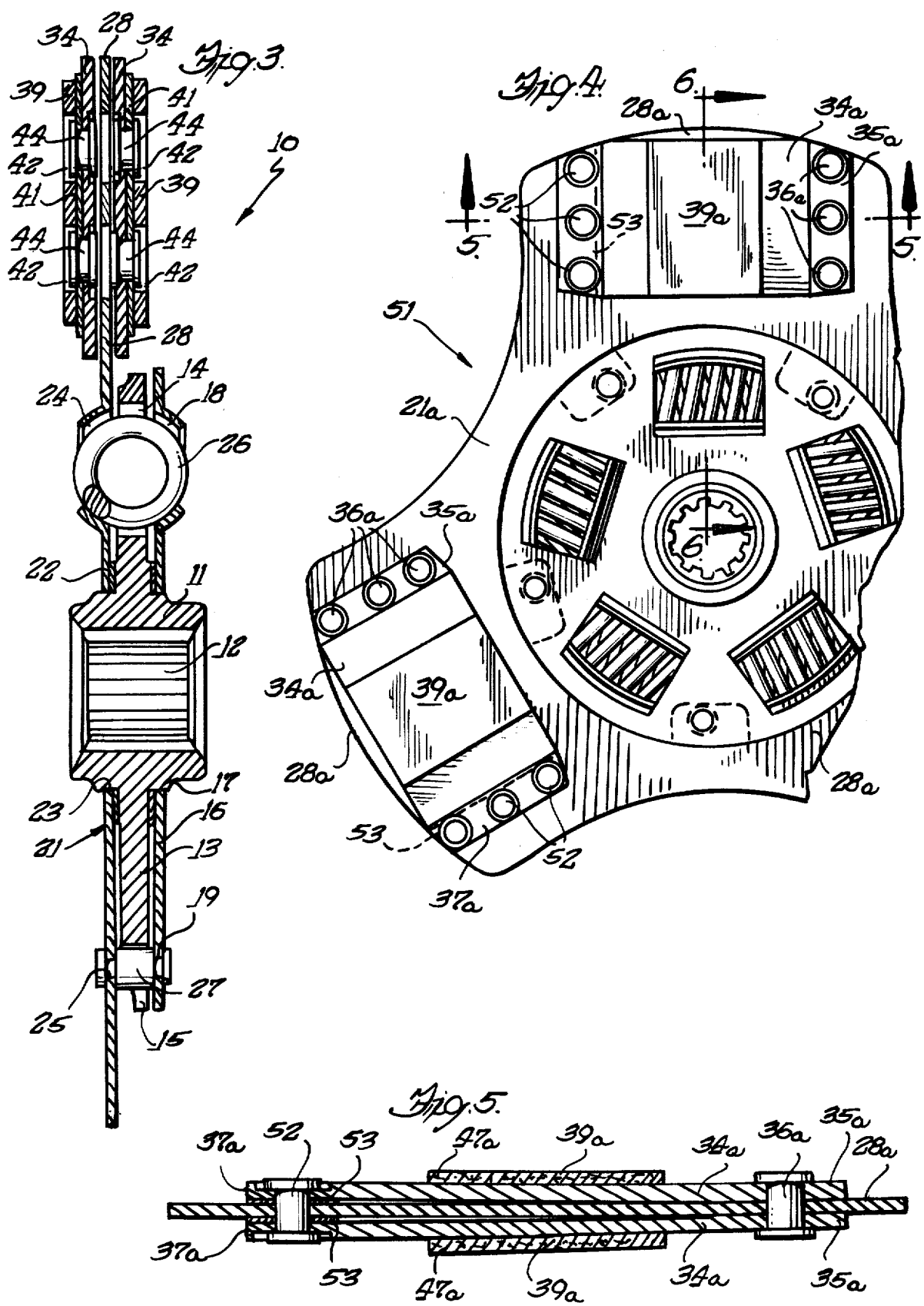

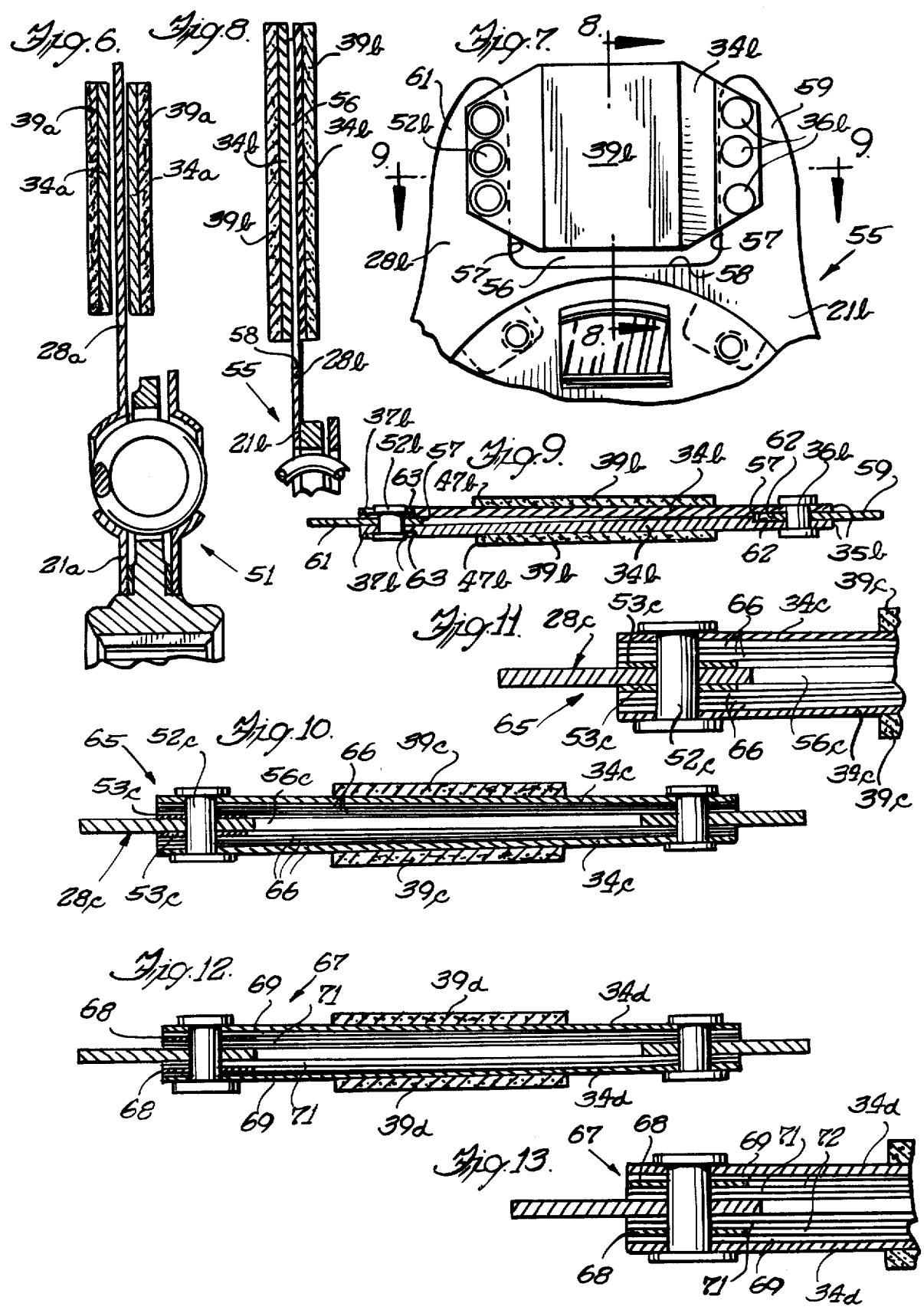

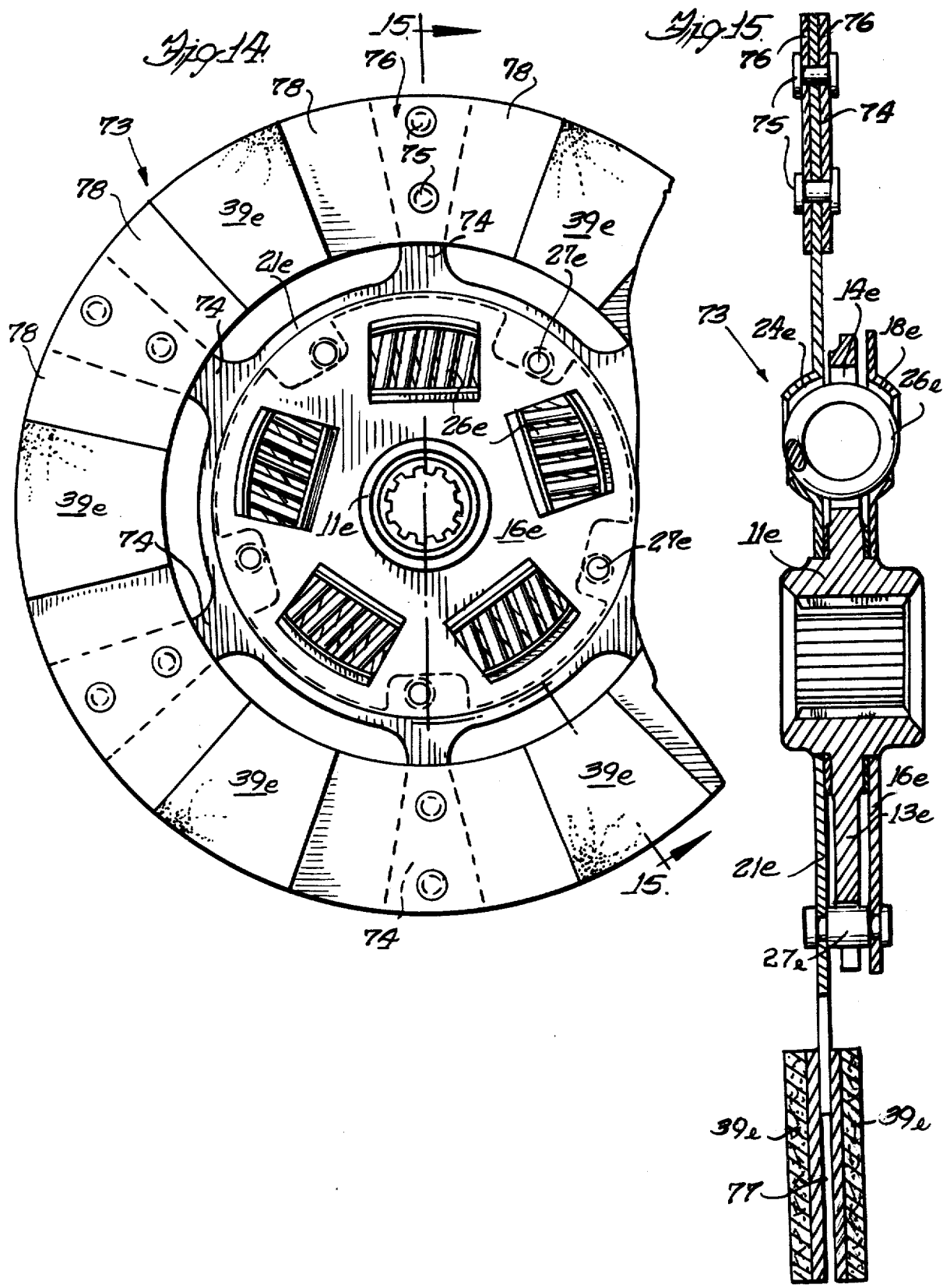

4,377,225

CLUTCH DRIVEN PLATE ASSEMBLY WITH VARIABLE FRICTION AREA

BACKGROUND OF THE INVENTION

Conventional friction clutch assemblies for automotive and other vehicles generally consist of a hub and integral flat clutch driven plate carrying suitable friction surfaces in the form of annular flat friction rings riveted or otherwise secured to the clutch plate. The plate and hub are positioned on a transmission input shaft between a flywheel and reciprocable pressure plate driven by the vehicle motor. When the vehicle operator depresses the clutch pedal, the pressure plate is axially moved away from the flywheel to disengage the clutch and, upon release of the pedal, the pressure plate moves toward the clutch plate which is engaged between the pressure plate and flywheel.

When the clutch is being engaged, the entire contact area of the opposite clutch surfaces substantially simultaneously engages the flywheel and pressure plate, and the clutch may chatter due to the aggressive, grabby nature of the friction material; especially if a metallic friction material is utilized. Chatter is generated when the capacity of an engagement point of the clutch matches the torque demand. At this time the relative motion between the clutching parts is zero, and the friction material assumes its higher static coefficient of friction to stop and hold on the engaging surfaces until the torque demand exceeds this capacity to cause the friction pads to break loose again into a dynamic condition. This jerky stopping and starting of the friction material is chatter. The present invention provides a clutch plate structure obviating the problem of chatter in the clutch.

SUMMARY OF THE INVENTION

The present invention relates to a novel clutch plate assembly wherein the clutch plate includes radially extending lobes carrying pads of friction material which are attached to cushioning means that resists the clutch engaging force to enhance clutch engagement. The cushioning means provides for a variable amount of friction material surface area to decrease the clutching capacity at initial clutch engagement and then allow for greater surface contact area as clutch engagement proceeds. This variable surface contact area during clutch engagement reduces chatter in the clutch.

The present invention also relates to a novel clutch plate assembly having friction pads with cushioning means to provide a resisting force to balance against the clutch engaging force so that the engaging force will be applied slower over a longer travel to give a better "pedal feel" and modulation for applying the clutch. The resisting force is supplied by compressing the cushioning means.

The present invention further comprehends a novel clutch plate assembly with friction pads on radial lobes of the clutch plate and cushioning means for the friction pads which is located away from the friction pads so as not to be affected by the heat generated by the pads during clutch engagement.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view of a clutch plate embodying the present invention.

FIG. 2 is a cross sectional view taken on the irregular line 2—2 of FIG. 1.

FIG. 3 is a vertical cross sectional view taken on the irregular line 3—3 of FIG. 1.

FIG. 4 is a partial rear elevational view of a second embodiment of the clutch plate.

FIG. 5 is a horizontal cross sectional view taken on the line 5—5 of FIG. 4.

FIG. 6 is a partial vertical cross sectional view taken on the line 6—6 of FIG. 4.

FIG. 7 is a partial rear elevational view of a third embodiment of the clutch plate.

FIG. 8 is a partial vertical cross sectional view taken on the line 8—8 of FIG. 7.

FIG. 9 is a horizontal cross sectional view taken on the line 9—9 of FIG. 7.

FIG. 10 is a horizontal cross sectional view similar to FIG. 9 but showing a fourth embodiment of cushioning means.

FIG. 11 is a partial enlarged cross sectional view of the left hand end of FIG. 10.

FIG. 12 is a horizontal cross sectional view similar to FIG. 9 but showing a fifth embodiment of cushioning means.

FIG. 13 is a partial enlarged cross sectional view of the left hand end of FIG. 12.

FIG. 14 is a rear elevational view of a sixth embodiment of the clutch plate.

FIG. 15 is a cross sectional view of this clutch plate taken on the irregular line 15—15 of FIG. 14.

DESCRIPTION OF THE PREFERRED EMBODIMENTS

Referring more particularly to the disclosure in the drawings wherein are shown illustrative embodiments of the present invention, FIGS. 1 through 3 disclose a clutch plate assembly 10 for use in an automotive vehicle clutch assembly between a motor driven flywheel and an axially reciprocable pressure plate rotated simultaneously with the flywheel and urged into engagement by a diaphragm spring (not shown). This clutch plate assembly is similar to conventional automotive clutch driven plate assemblies including a hub 11 with a central splined opening 12 adapted to receive the splined end of a transmission input shaft (not shown) and a radial flange 13 having circumferentially spaced windows 14 and peripheral notches 15 therein. A spring retainer plate 16 has a central opening 17 receiving the hub 11, circumferentially spaced windows 18 and openings 19 formed therein.

A clutch driven plate 21 has a generally circular central body portion 22 with a central opening 23 receiving the hub 11, circumferentially spaced windows 24 and openings 25. The windows 14, 18 and 24 in the hub flange 13, spring retainer plate 16 and clutch plate 21, respectively, are axially aligned to receive compression springs 26 for torsional damping of the clutch. Spacer rivets 27 are received in the openings 19 and 25 in the plates to secure them together and pass through the peripheral notches 15 in the hub flange to provide a limit on the relative rotary movement between the plates and the hub.

The clutch plate is provided beyond the stop pins 27 with three radially extending lobes 28 which are circumferentially equally spaced about the plate. Each lobe 28 has generally parallel sides 29, 31 terminating in a curved outer edge 32, and an opening 33 is located adjacent one edge 29. A pair of elongated support plates 34, 34 are positioned on opposite surfaces of the lobe 28 and riveted together at one end 35 of each plate and to the lobe by rivets 36 along the lobe edge 31. The opposite end 37 of each plate 34 is free and positioned over the opening 33; the opening containing a pair of oppositely disposed spring washers or Belleville springs 38, 38 engaging the plate ends 37 and biasing them away from the surfaces of the lobe 28.

A pad 39 of a suitable friction material, such as a metallic friction material is secured to a backing plate 41, and the pad and plate have one or more aligned openings 42 and 43, respectively, to receive a rivet 44 to secure the friction pad to the plate 34; the plate having an opening to receive the rivet and which is counterbored on the inner surface at 45 to accommodate the headed end 46 of the rivet (FIG. 2).

The spring washers 38, 38 are trapped in the opening 33 by the plates 34, 34 and act as a cushioning means for the friction pads. This assembly operates in a conventional manner in the clutch assembly except for the cushioning means. As the clutch is engaged by the vehicle operator, the pressure plate squeezes the friction pads 39, 39 against the flywheel; the pads contacting the engaging surfaces on their edge portions 47, 47 with a reduced contact area which limits its capacity and reduces its desire to chatter.

Chatter is generated when the capacity of an engagement point matches the torque demand and the relative motion between the clutching parts is zero. The friction material at this time assumes its higher static coefficient of friction to stop and hold on the engaging surfaces until the torque demand exceeds this capacity to cause the pads to break loose again into a dynamic condition. This jerky stopping and starting of the friction material is chatter and, by reducing the capacity of the friction material at initial engagement by reducing its contact area, the pads are more prone to slip to prevent chatter from occurring.

As the clutch engagement continues, the spring washers 38, 38 are compressed to allow a proportionally larger area of the pads 39, 39 to contact the engaging surfaces until the clutch is fully engaged. The Belleville springs or spring washers 38, 38 are located away from the friction pads 39, 39 so that the springs will not be affected by the heat generated by the pads during clutch engagement. Also, the friction pads 39, 39 will break-in to have a crowned-type wear pattern that will present a proportionally greater area to its engaging surfaces as the spring washers compress.

FIGS. 4 through 6 disclose a second embodiment of clutch plate assembly 51 wherein like parts will have the same reference numeral with a script a. This assembly includes a clutch plate 21a with three radial lobes 28a, each lobe carrying a pair of support plates 34a, 34a secured at one end 35a to the lobe by rivets 36a and at the opposite end 37a by a second set of rivets 52. A friction pad 39a is securely bonded, as by a suitable adhesive, to each plate 34a. Located between each plate trailing end 37a and the lobe 28a and receiving the rivets 52 is an elongated spacer 53 to space the plates away from the lobe surfaces. The plates 34a and spacers 53 provide the cushioning means.

This assembly operates in a conventional manner except for the cushioning means wherein, as the clutch is engaged, the friction pads 39a contact the engaging surfaces on their edge portions 47a with a reduced contact area. As the clutch is further engaged, the plates 34a deflect due to the spacers 53 to allow a proportionally greater area of the pads to contact the engaging surfaces. The plates 34a are made of a resilient metal and uses its natural springiness to generate the cushioning force when the pads are squeezed together to deflect the plates.

FIGS. 7 through 9 relate to a third embodiment of clutch plate assembly 55 with like parts having the same reference numerals with a script b. The clutch plate 21b has three equispaced radial lobes 28b with a central cut-out or recess 56 in each lobe having parallel side edges 57, 57 and an inner edge 58 to form a pair of parallel lobe arms 59, 61. A pair of support plates 34b, 34b having friction pads 39b, 39b securely bonded thereto are secured at their ends to the lobe arms 59, 61 by rivets 36b and 52b, respectively.

As more clearly seen in FIG. 9, the ends 35b of the plates 34b have openings receiving the rivets 36b and are internally recessed at 62 to receive the inner edge 57 of arm 59 so that the plates substantially abut within the recess 56 adjacent the arm edge 57. The opposite arm 61 spaces the plate ends 37b apart, with the openings receiving the rivets 52b being counterbored in the outer plate surfaces at 63 to receive the headed ends of the rivets. Here again, as in the embodiment of FIGS. 4 through 6, the inherent springiness of the material forming the plates generates the cushioning force as the pads 39b are squeezed when the clutch is engaged, and the contact area proceeds from the trailing edge 47b of each pad to an enlarged contact area.

FIGS. 10 and 11 disclose another embodiment of cushioning means 65 used on each lobe 28c of a clutch plate where the lobe has an outwardly opening recess 56c such as that shown in FIG. 7. Each plate 34c carries a friction pad 39c securely bonded thereto and is a material lamination which, in turn is supported by several high temperature spring quality laminations 66. An elongated spacer 53c is positioned at the rivets 52c between the surface of lobe arm 61c and the innermost of the laminations 66.

The laminations 66 are formed of any suitable material with a natural springiness and a resistance to high temperatures, the laminated structure providing the plates 34c with an increased thermal protection from the heat generated by the friction pads 39c during clutch engagement by interrupting the path of heat conductivity and causing a more responsive cushioning effect. The cut-out or recess 56c in each lobe provides a path for cooling air to circulate between the laminations 66 and provides an opening for contamination to exit which might otherwise wedge between the laminations. This embodiment operates in the same general manner as the embodiment of FIGS. 4 through 6.

The embodiment of FIGS. 12 and 13 discloses a cushioning means 67 substantially identical to that of FIGS. 10 and 11, except that the spacer 68 is located between the laminations 69 and 71 to cause a gap 72 therebetween. This construction causes a lower rate initial cushioning force by deflecting a portion of the laminations until the gap 72 closes and then deflecting all laminations, including the support lamination 34d for the friction pad 39d to provide a softer cushioning rate at initial clutch engagement.

FIGS. 14 and 15 disclose a sixth embodiment of clutch plate assembly 73 with like parts having the same reference numeral with the addition of a script e. This assembly includes a hub 11e with a radial flange 13e, and a spring retainer plate 16e and clutch plate 21e secured together by spacer rivets 27e. Damper springs 26e are received in axially aligned windows 14e, 18e and 24e of the hub flange, spring retainer plate and clutch plate, respectively. The clutch plate 21e at its periphery has a plurality of circumferentially equally spaced radial lobes or spokes 74 to which are secured, as by rivets 75 a pair of support rings 76, 76 on the opposite sides of the clutch plate 21e. Friction pads 39e are securely bonded to and circumferentially equally spaced on each ring 76 between the spokes 74; the rings being secured on the opposite surfaces of the spokes to form a gap 77 between the pads 39e. The rings are made of a material having a natural springiness, so that as the friction pads 39e are squeezed together by the engaging surfaces during clutch engagement, the rings 76, 76 deflect at areas 78 to generate a resisting cushioning force.

We claim:

1. A clutch driven plate comprising a generally circular plate having a plurality of circumferentially equally spaced radially extending lobes on the periphery thereof, a pair of separate oppositely disposed support plates secured to each lobe on the opposite surfaces thereof, each support plate having at least one friction pad secured thereto, and cushioning means between said friction pads to provide for a variable friction contact area as clutch engagement proceeds from initial engagement of a trailing edge of each pad with the engaging surfaces of a flywheel and pressure plate of a clutch assembly, said cushioning means being offset from the center of the friction pads so that the trailing edge of each pad makes initial contact.

2. A clutch plate as set forth in claim 1, wherein a separate support plate is secured to each surface of a clutch plate lobe, and a friction pad is secured onto each support plate.

3. A clutch plate as set forth in claim 1, in which each support plate is generally rectangular and extends transversely across the lobe, one end of each support plate being secured to said lobe with the opposite end being free, each lobe having an opening therein offset from the center thereof, the free end of each support plate covering said opening, and said cushioning means comprises a pair of oppositely disposed spring washers received in said opening to contact and urge the free ends of said support plates away from said lobe.

4. A clutch plate as set forth in claim 3, in which said friction pads are riveted to their respective support plates.

5. A clutch plate as set forth in claim 1, in which each said support plate is generally rectangular and extends transversely across the lobe, at least one end of each support plate being secured to said lobe.

6. A clutch plate as set forth in claim 5, in which each lobe has a central cut-out portion to form parallel lobe arms, the opposite ends of each support plate being riveted to said lobe arms, one end of each support plate having a transversely extending interior recess receiving the edge of said lobe arm, said recesses allowing the support plates to substantially abut inside of said last-mentioned lobe arm, the opposite end of each support plate engaging the opposite lobe arm, said opposite support plate ends having externally counterbored openings receiving the enlarged heads of said rivets.

7. A clutch plate as set forth in claim 5, in which the opposite ends of each support plate are secured to the lobe, and said cushioning means includes a spacer at one end of said support plate spacing the support plate end from the lobe.

8. A clutch plate as set forth in claim 7, in which the natural springiness of said support plates coacting with said spacers provide the cushioning action of the friction pads.

9. A clutch plate as set forth in claim 8, wherein a plurality of laminations are stacked beneath each support plate and are secured to each lobe, said spacers being positioned between the laminations and the lobe.

10. A clutch plate as set forth in claim 9, in which said laminations are formed of a material having a natural springiness and resistance to high temperature.

11. A clutch plate as set forth in claim 9, in which said lobe is cut-out to form parallel lobe arms, said support plates and laminations having their opposite ends secured to said spaced lobe arms.

12. A clutch plate as set forth in claim 11, wherein said spacers are positioned between the several laminations, said laminations being formed of a material having a natural springiness and resistance to high temperature.

13. A clutch driven plate comprising a generally circular plate having a plurality of circumferentially equally spaced radially extending lobes on the periphery thereof, a pair of oppositely disposed support plates in the form of annular rings secured to the opposite surfaces of the clutch plate lobes, a plurality of friction pads secured to said rings intermediate said lobes, and cushioning means between said friction pads to provide a variable friction contact area as clutch engagement proceeds from initial engagement.

14. A clutch plate as set forth in claim 13, in which a suitable gap is formed between said rings at said friction pads, the unsupported portions of said support rings being able to deflect as the friction pads are squeezed by the engaging surfaces of said clutch assembly.

* * * * *